United States Patent
Plachner

(10) Patent No.: US 11,420,392 B2
(45) Date of Patent: Aug. 23, 2022

(54) TRANSPORT UNIT AND PREPARATION OF A THREE-DIMENSIONAL COMPONENT

(71) Applicant: EOS GmbH Electro Optical Systems, Krailling (DE)

(72) Inventor: Kai Plachner, Maisach (DE)

(73) Assignee: EOS GmbH Electro Optical Systems, Kralling (DE)

( * ) Notice: Subject to any disclaimer, the term of this patent is extended or adjusted under 35 U.S.C. 154(b) by 296 days.

(21) Appl. No.: 15/805,367

(22) Filed: Nov. 7, 2017

(65) Prior Publication Data
US 2018/0133966 A1    May 17, 2018

(30) Foreign Application Priority Data
Nov. 15, 2016 (DE) ................. 10 2016 121 946.0

(51) Int. Cl.
*B29C 64/371* (2017.01)
*B29C 64/25* (2017.01)
*B33Y 30/00* (2015.01)
*B29C 64/259* (2017.01)
*B33Y 10/00* (2015.01)
(Continued)

(52) U.S. Cl.
CPC .......... *B29C 64/371* (2017.08); *B29C 64/153* (2017.08); *B29C 64/25* (2017.08);
(Continued)

(58) Field of Classification Search
CPC ... B29C 64/371; B29C 64/379; B29C 64/259; B29C 64/25; B65D 81/2069
See application file for complete search history.

(56) References Cited

U.S. PATENT DOCUMENTS

| 5,364,219 A | 11/1994 | Takahashi et al. |
| 5,658,412 A | 8/1997 | Retallick et al. |

(Continued)

FOREIGN PATENT DOCUMENTS

| CN | 105142826 | 12/2015 |
| CN | 105252000 | 1/2016 |

(Continued)

OTHER PUBLICATIONS

Translation of DE102008049341.*
(Continued)

*Primary Examiner* — Alison L Hindenlang
*Assistant Examiner* — Asha A Thomas
(74) *Attorney, Agent, or Firm* — Seyfarth Shaw LLP

(57) ABSTRACT

A transport unit for transporting an additively manufactured three-dimensional component including a transfer interface which can be closed in a substantially gastight manner for the three-dimensional component and/or a container containing the three-dimensional component and/or a platform carrying the three-dimensional component, which transfer interface is configured and disposed so that it cooperates with an output interface of an additive manufacturing machine which has manufactured the three-dimensional component within the framework of a component transfer as intended and when a connection is made as intended between the transfer interface and output interface a substantially gastight connection can be produced, and a storage chamber for storing the component and/or the container and/or the platform in a substantially gastight sealed state towards the outside.

16 Claims, 4 Drawing Sheets

(51) Int. Cl.
  *B29C 64/379* (2017.01)
  *B29C 64/153* (2017.01)
  *B65D 81/20* (2006.01)
  *B23Q 7/14* (2006.01)
  *B29C 64/245* (2017.01)
  *B22F 12/00* (2021.01)
  *B33Y 40/00* (2020.01)
  *B33Y 80/00* (2015.01)
  *B60P 1/64* (2006.01)

(52) U.S. Cl.
  CPC .......... *B29C 64/259* (2017.08); *B29C 64/379* (2017.08); *B33Y 10/00* (2014.12); *B33Y 30/00* (2014.12); *B65D 81/2069* (2013.01); *B22F 12/00* (2021.01); *B23Q 7/14* (2013.01); *B29C 64/245* (2017.08); *B33Y 40/00* (2014.12); *B33Y 80/00* (2014.12); *B60P 1/6418* (2013.01); *Y02P 10/25* (2015.11)

(56) References Cited

U.S. PATENT DOCUMENTS

| | | | |
|---|---|---|---|
| 7,357,629 | B2 | 4/2008 | Weiskopf et al. |
| 2004/0045941 | A1 | 3/2004 | Herzog et al. |
| 2017/0334134 | A1 | 11/2017 | Herzog |
| 2018/0056391 | A1* | 3/2018 | Buller .................... B29C 64/25 |
| 2021/0197477 | A1 | 7/2021 | Pourcher et al. |

FOREIGN PATENT DOCUMENTS

| | | | | |
|---|---|---|---|---|
| CN | 105722665 | | 6/2016 | |
| CN | 205324730 | | 6/2016 | |
| DE | 10053741 | | 2/2002 | |
| DE | 102004057866 | | 11/2004 | |
| DE | 102006013489 | | 11/2006 | |
| DE | 102008049341 | | 4/2010 | |
| DE | 102008049341 | A1 * | 4/2010 | ....... H01L 21/67736 |
| DE | 102009036153 | | 2/2011 | |
| DE | 102009036153 | A1 * | 2/2011 | .......... B29C 64/259 |
| DE | 202013009787 | | 12/2013 | |
| DE | 102014016718 | | 5/2016 | |
| EP | 3393699 | | 10/2020 | |

OTHER PUBLICATIONS

Translation of Hofmann (DE102009036153).*
Chinese Office Action for Application No. 201711130593.3 dated Dec. 11, 2020, 12 pages.

* cited by examiner

Fig. 5
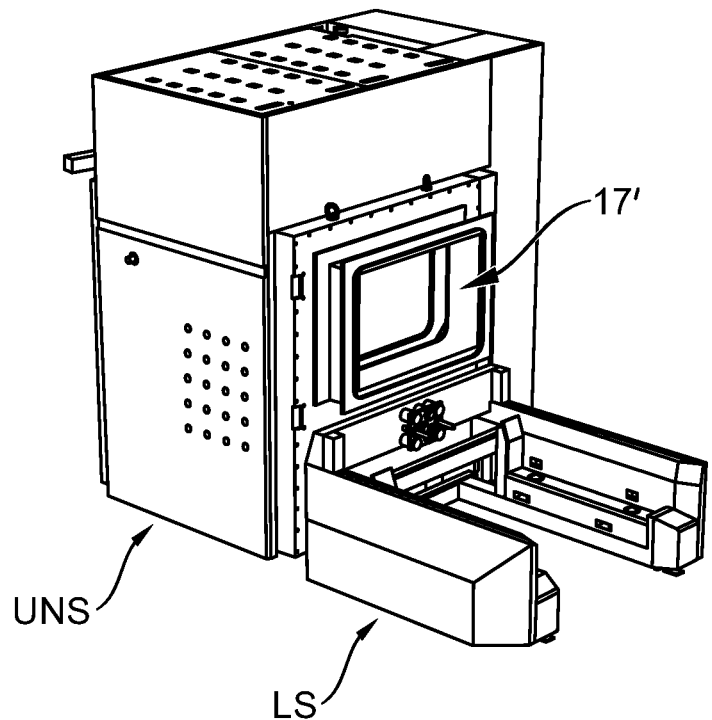
Fig. 6a 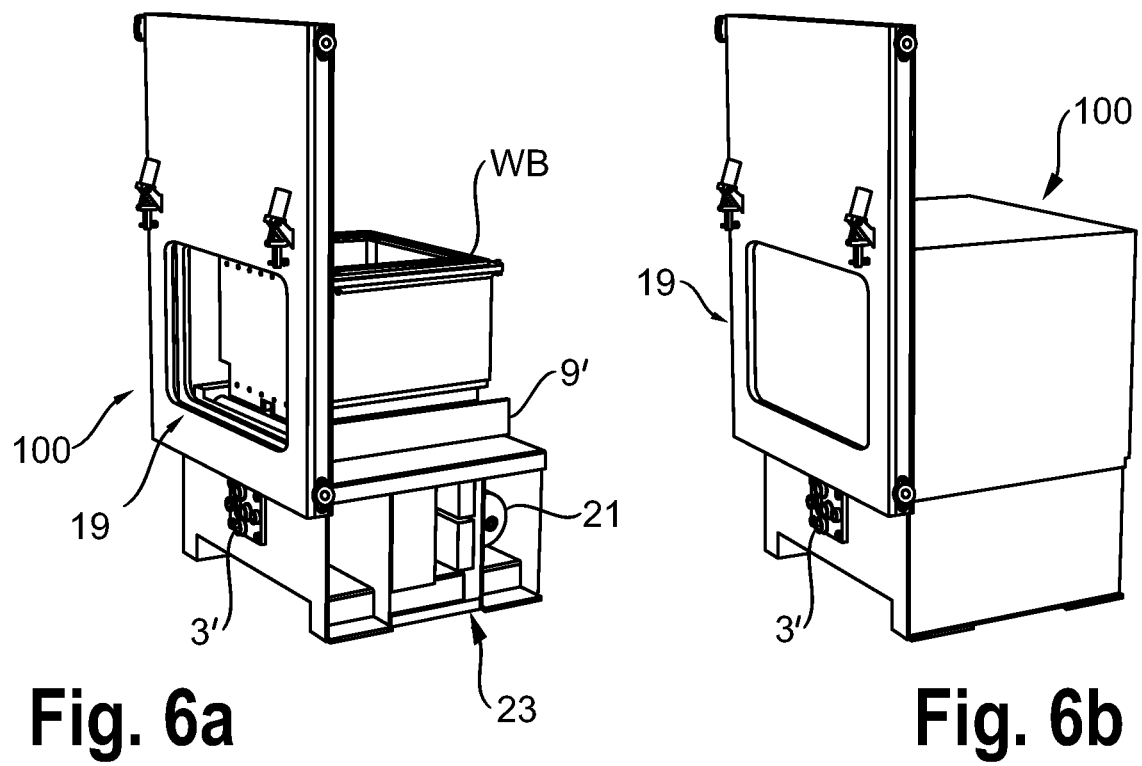 Fig. 6b

TRANSPORT UNIT AND PREPARATION OF A THREE-DIMENSIONAL COMPONENT

TECHNICAL FIELD OF THE INVENTION

The invention relates to a transport unit for transporting an additively manufactured three-dimensional component. It further relates to a preparation system for three-dimensional components as well as a method for preparing a three-dimensional component.

BACKGROUND OF THE INVENTION

In additive manufacturing, commonly also known as "3D printing," three-dimensional components are manufactured on the basis of computer-generated control commands A particularly prominent example for additive manufacturing is known under the name "selective laser sintering or laser melting." In this case, a thin layer of a (powdery) construction material is repeatedly applied and the construction material is selectively solidified in each layer by selective irradiation of locations corresponding to a cross-section of the object to be produced by means of a laser beam. This is usually accomplished in a protective gas atmosphere.

After completion of the three-dimensional object in the corresponding additive manufacturing machine, it is removed from this manufacturing machine after a waiting time. This waiting time is used for a first cooling of the component or of the construction material surrounding it primarily to avoid a risk of ignition during removal (particularly in the case of metal components) or a risk of damage (particularly in the case of plastic components). Usually the three-dimensional component is supplied to further processing steps, for example, a targeted cooling, a removal of unsolidified construction material surrounding the three-dimensional object, a surface processing or a further processing as part of a subsequent manufacturing process (possibly drilling, milling, sawing (possibly to remove support structures between a (building) platform and the three-dimensional component) etc.).

The corresponding three-dimensional object is usually not removed as a single piece from the additive manufacturing machine but for example inside an alternate frame (i.e., a chamber containing the three-dimensional component which can be removed from the manufacturing machine) and/or on a (or connected to a) platform bearing the three-dimensional component (which was used as a building platform during the additive manufacture).

WO 2016/075025 A1 discloses a production system comprising at least two construction devices, in the form of additive manufacturing machines, a removal station (for the afore-mentioned removal of unsolidified construction material surrounding the three-dimensional object) and a post-processing station (for thermal or surface mechanical after-treatment of the three-dimensional components) as well as further components. These components are interconnected in a transport chain by means of a self-driven transport means (hereinafter synonymously designated as transport unit). The disclosure of this document is understood here as disclosure of the invention presented here; the invention presented here can thus be supplemented and enriched by any features of this disclosure.

It is an object of the present invention to provide an improved or further developed transport unit which preferably in particular ensures more secure and/or more effective transport processes. Furthermore, it is the object of the invention to provide an improved method for preparing a three-dimensional component which is preferably in particular more effective and less time-intensive than previously known methods.

This object is solved by a transport unit according to claim 1 or 2, a preparation system according to claim 6 and a method according to claim 8. Further developments of the invention are described in the subclaims, whose features in the same way as the features of the following description can also be used within the framework of all the other claim categories for further developments unless the contrary is explicitly mentioned.

Accordingly the transport unit according to the invention of the type mentioned initially comprises at least the following components:

a) a transfer interface which can be closed in a substantially gastight manner for the three-dimensional component and/or a container containing the three-dimensional component and/or a platform carrying the three-dimensional component, which transfer interface is configured and arranged so that it cooperates with an output interface of an additive manufacturing machine which has manufactured the three-dimensional component within the framework of a component transfer as intended and when a connection is made as intended between the transfer interface and output interface a substantially gastight connection can be produced. The transfer interface can therefore be opened for transfer and then closed in a gastight manner; this comprises in effect a type of lock towards the output interface of the additive manufacturing machine, which output interface forms a second lock or the two said interfaces jointly form a cooperating lock system, whose two locks can preferably only be opened and/or closed jointly, for example with the aid of a locking mechanism which only allows an opening of both locks when they are positioned with respect to one another in a desired position in which a gastight connection is ensured between the two locks. When opening the two locks it is preferably ensured that the (protective gas) atmospheres inside the (process chamber of the) additive manufacturing machine and the storage chamber are compatible with one another. This can for example be ensured whereby the same protective gas atmosphere is formed in both said chambers as will be explained in further detail below. Also a combined gas sensor or monitoring system can be used here for matching the atmospheric conditions between the two said chambers so that for example in a control circuit the atmospheres in the two said chambers are adjusted to one another or adapted to one another. The said locks or interfaces can, for example, comprise pivotable or displaceable lids which are circumferentially sealed in the closed state.

b) A storage chamber for storing the component and/or the container and/or the platform in a substantially gastight sealed state towards the outside. The storage chamber is in this case preferably provided with the transfer interface, i.e., a portion of the outwardly facing wall of the storage chamber is then formed by the transfer interface. The transport unit is further preferably fitted with transport-assisting means, i.e., those means which facilitate or allow a self-driven and/or externally driven transport of the transport unit. This includes in particular wheels, wings, rotors and drive motors but also running rails and much more.

By means of the transport unit according to the invention, it is possible to transfer the three-dimensional component produced via the two interfaces, in other words: the lock system, from the process chamber into the storage chamber without the protective gas atmosphere needing to be removed from the process chamber. On the contrary, the protective gas atmosphere can be built up permanently and/or held during and/or prior to the transfer in the storage chamber.

The transport unit therefore preferably further comprises a preparation unit which during operation, in particular during transport of the component inside the storage chamber, prepares a protective gas in the storage chamber. A preparation unit can consist of several, in principle spatially separated components, for example those described further below.

In general terms, a transport unit according to the invention can alternatively or additionally to that stated above comprise:
 a storage chamber for storing the component and/or a container containing the three-dimensional component and/or a platform carrying the three-dimensional component and/or
 the container containing the three-dimensional component. This means that instead of the storage chamber, the container in which the three-dimensional component has been built during additive manufacturing, in particular an exchangeable container, can also be used directly as part of the transport unit instead of an additional storage chamber surrounding the container.
 and a preparation unit, which during operation, in particular during transport of the component inside the storage chamber and/or the container prepares a protective gas in the storage chamber and/or the container and/or a substantially gastight seal of the container. Thus, for the production (or maintenance) of the protective gas atmosphere in the transport unit, a flooding with protective gas from the process chamber is not relied upon but the transport unit is autonomous in relation to protective gas supply which considerably simplifies the transport and primarily the transfer process of the three-dimensional component from the process chamber. Within the framework thereof, it is preferred that the preparation unit comprises a gas container for the protective gas which is entrained during transport. Alternatively or additionally, the preparation unit comprises a connection interface for supplying the protective gas into the transport unit, in particular into the storage chamber and/or the gas container. In the latter case, the gas container is filled via the connection interface with protective gas which can then subsequently be delivered successively into the storage chamber or the container in which the three-dimensional component has been produced, in the former case the storage container is flooded directly with protective gas. In other words: a gas container here serves as a buffer or reservoir to provide more protective gas for longer into the storage chamber or the container.

The transport unit further preferably comprises a number of gas sensors inside the storage chamber for measurement of a gas concentration or a gas pressure of the protective gas and/or other gases in the storage chamber. Other gases whose concentration/pressure could be monitored are in particular those gases of which it is known that they are chemically reactive with the construction material from which the three-dimensional part is made, i.e., in particular oxygen. With the aid of a measurement from the gas sensors, an introduction of protective gas into the storage chamber can be controlled or regulated more simply. As described above, a control or regulation can serve to specifically (for example, threshold-value-based) produce or force a desired gas concentration in the storage chamber before the aforementioned two locks are jointly opened.

According to an advantageous further development of the transport unit according to the invention, the storage chamber is configured to be detachable from a movable support region. "Movable" is understood in this context as fundamentally any type of movability, i.e., not only the possibility of driving but also sliding or flying. As a result of the detachable connection of the storage chamber from a support region which can be understood as the transport module of the transport unit, it is ensured that the storage chamber and the support region can be operated independently of one another. Thus, the support region can successively transport several storage chambers or even other elements such as transport pallets or similar whereas the storage chamber is positioned in a fixed position at the time "parked" elsewhere, possibly in connection with an additive manufacturing machine or other machines/stations.

A preparation system according to the invention for three-dimensional components comprises at least one additive manufacturing machine with an output interface and a transport unit according to the invention. The transport unit is therefore part of the preparation system to which other system components can also belong, in particular:
 a) a cooling station, in particular with a first takeover interface which can be brought into functional cooperation with the transfer interface,
 b) an unpacking station, in particular with a second takeover interface, which can be brought into functional cooperation with the transfer interface,
 c) a pre- and/or post-processing station, configured for pre- and/or post-processing of the container containing the three-dimensional component and/or the platform bearing the three-dimensional component
 d) a quality checking station,
 e) a surface processing station, configured for the surface processing of the three-dimensional component, preferably with a third takeover interface which can be brought into functional cooperation with the transfer interface,
 f) a removal station, configured for removal of the three-dimensional component from the supporting platform preferably with a fourth takeover interface which can be brought into functional cooperation with the transfer interface,
 g) a supply and/or transfer store for materials and/or aids for performing the additive manufacturing method and/or for the three-dimensional object,
 h) a supply station with a number of supply connections to the transport unit, preferably for charging with electrical energy and/or for providing the protective gas.

The invention further relates to a method for preparing a three-dimensional component, at least comprising the following steps:
 a) producing the three-dimensional component by means of additive manufacture, in particular powder-based additive manufacture, in a process chamber of an additive manufacturing machine under protective gas atmosphere,
 b) removal, preferably direct removal of the three-dimensional component from the process chamber by substantially continuous holding of the component in a protective gas atmosphere, preferably by means of transfer into a region held under protective gas atmosphere, in particular a storage chamber of a moveable transport unit, in particular according to the invention. A direct removal is understood in particular as a substantially immediate removal, i.e., for example, a substantially cooling-pause-free removal. As a result of the transport unit according to the invention, it can be achieved safely and promptly for the first time to remove additively manufactured components whilst avoiding a cooling pause in an additive manufacturing machine since the components are held under protective gas during and after removal and therefore no risk of ignition nor any risk for the component itself due to "premature" removal is to be expected. This measure according to the present state saves at least half an hour of cooling time in the additive manufacturing machine so that automatically unproductive down times of the additive manufacturing machine are thus eliminated.

c) Preparation of the component by transfer from the transport unit into a further processing unit (which in turn can comprise a further additive manufacturing machine) and/or by outputting from the transport unit to a user.

"Protective gas" is understood within the framework of the invention as fundamentally any gas or gas mixture under the conditions of which the component and/or the construction material can be processed substantially safely in the additive manufacture. Particularly preferred here is the use of nitrogen and/or argon as protective gas.

SUMMARY OF THE INVENTION

Within the scope of the invention it is particularly advantageous because it is simple and logically continuously if substantially the same protective gas is used in the process chamber and the storage container and/or the afore-mentioned container. Inter alia, it is thus also ensured that two different protective gases do not enter into undesired (for example, chemical) interactions with one another. The "same protective gas" is understood as two gases or gas mixtures whose chemical composition is substantially the same which preferably also come from the same supply source and/or have substantially the same temperature. For this purpose (for example on the basis of temperature measurements of the protective gas (in particular in the storage chamber)), the introduced protective gas can be specifically temperature-controlled, i.e., heated and/or cooled.

Preferably the transport unit is not only used to remove the three-dimensional component (which however is completely covered within the scope of the invention) but following step b) the transport unit is transferred to at least one further system component of a preparation system as a further processing unit, in particular a system component of a preparation system of the aforesaid type. In other words the transport unit therefore transports the three-dimensional component from the additive manufacturing machine to at least one further system in which it can be further processed in any form.

It is further preferred that the transport unit is moved spatially separately outside the additive manufacturing machine. In this case, the transport unit is therefore not a transport means inside the additive manufacturing machine but can be moved spatially independently of this.

The invention has a particular advantage if the three-dimensional component is made from a construction material which substantially comprises a number of polymers and/or a number of metals. As already outlined above, during the direct removal of additively manufactured three-dimensional components according to the previous prior art, there is the risk of ignitability in the case of metal construction materials and of undesired chemical modifications in the case of plastic construction materials. "Substantially comprise" is understood here to mean that the construction material contains more than 50 volume percent, preferably more than 80 volume percent, particularly preferably more than 90 volume percent of the material classes specified above.

A further development of the invention consists in that the transport unit is supplied by means of a supply station with a number of supply connections, for example for charging with electrical energy and/or for preparing the protective gas. The supply station can be connected to a component of the preparation system according to the invention and/or to the additive manufacturing machine or can be localized adjacent thereto; however, it can also be a stand-alone unit which for example can be implemented as a component (see above) of the preparation system according to the invention.

BRIEF DESCRIPTION OF THE DRAWINGS

The invention is described hereinafter in detail with reference to an exemplary embodiment along the figures. The figures should be understood as not necessarily to scale:

In the figures:

FIG. 5 shows a perspective side view of the unpacking station from FIG. 1;

FIGS. 6a and 6b show two perspective side views of the storage chamber from FIG. 1, in the open state omitting the external encasement (FIG. 6a) and in the closed state with the external encasement;

DETAILED DESCRIPTION OF THE EMBODIMENTS

Figure 1:
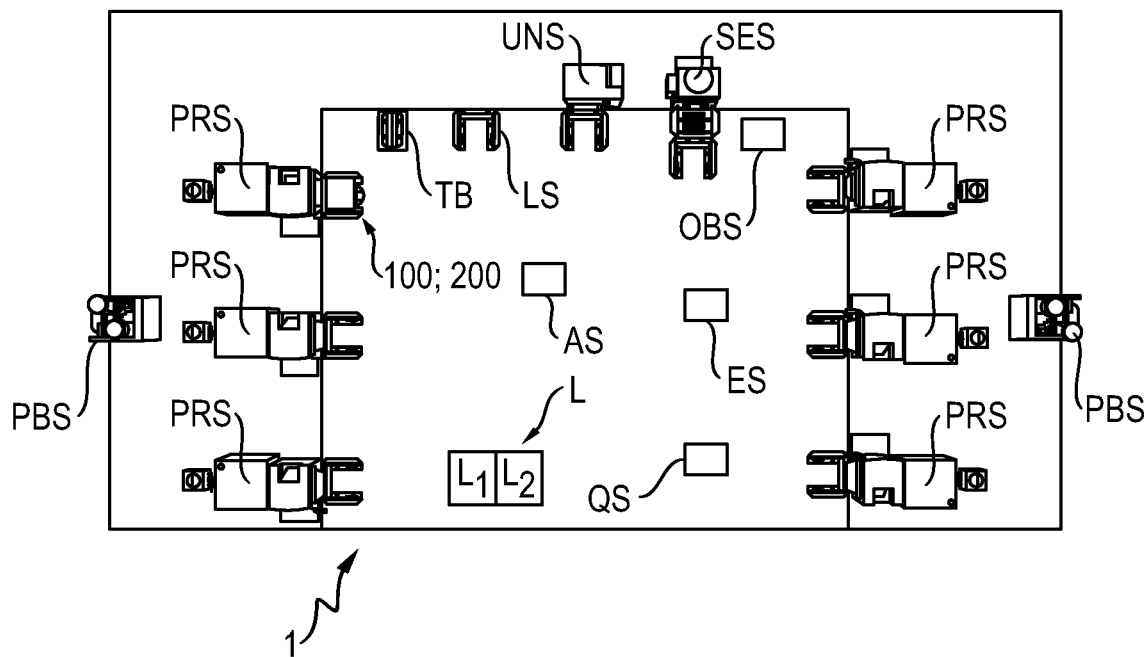
FIG. 1 shows an exemplary embodiment of a preparation system according to the invention viewed from above, in part with schematic block diagrams, in part with realistically inclined diagrams of components.

FIG. 1 shows an exemplary embodiment of a preparation system 1 according to the invention with numerous components: shown are six additive manufacturing machines PRS, a cooling station AS, a supply station LS, a movable support region TB for a transport unit according to the invention, a pre- or post-processing station SES, an unpacking station UNS, two material preparation stations, here powder preparation stations PBS, a surface treatment station OBS, a quality checking station QS, a removal station ES and a supply and/or transfer store L which is divided into a supply region $L_1$ and a transfer region $L_2$ as well as a transport unit 200 according to the invention with a storage chamber 100.

Figure 2:
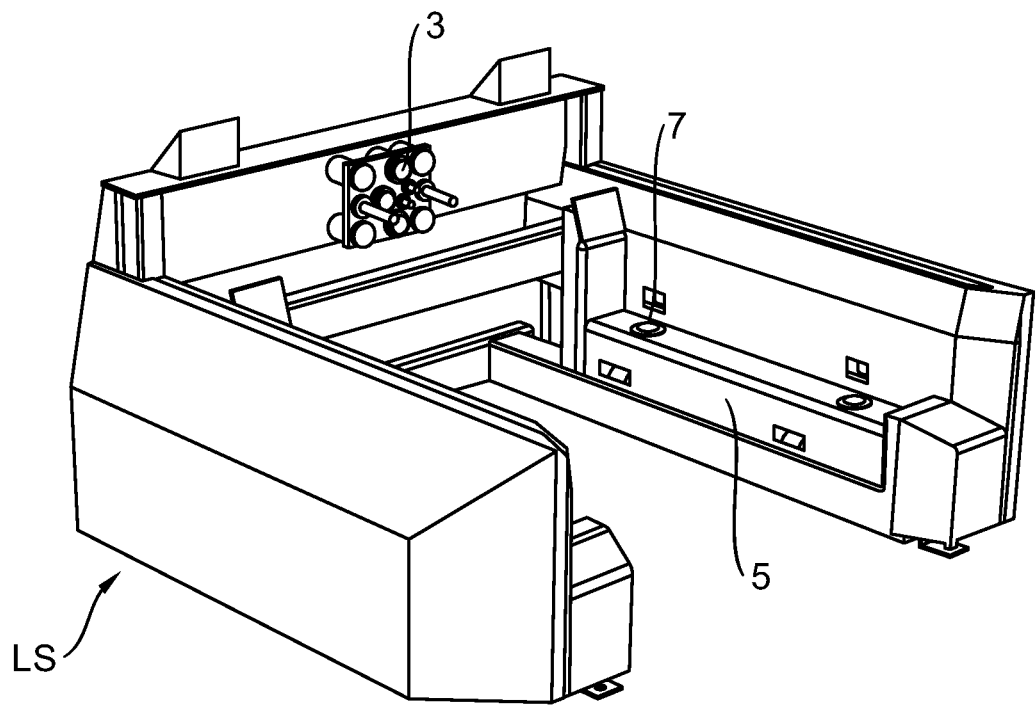
FIG. 2 shows a perspective side view of the supply station from FIG. 1.

FIG. 2 shows the supply station LS in more detail. In addition to a guide 5 via which the transport unit according to the invention can be guided into a target position, this has a supply coupling 3 by means of which the transport unit can be supplied with protective gas. The attainment of the target position as intended by the transport unit is achieved by locking in four target locking regions 7 (of which two can be seen here). An induction mat can be provided underneath the supply station which charges the transport unit or only its movable support region TB with electrical energy. Other electrical charging mechanisms, for example, based on a plug system to produce a galvanic electrical connection inter alia are also possible.

Figure 3:
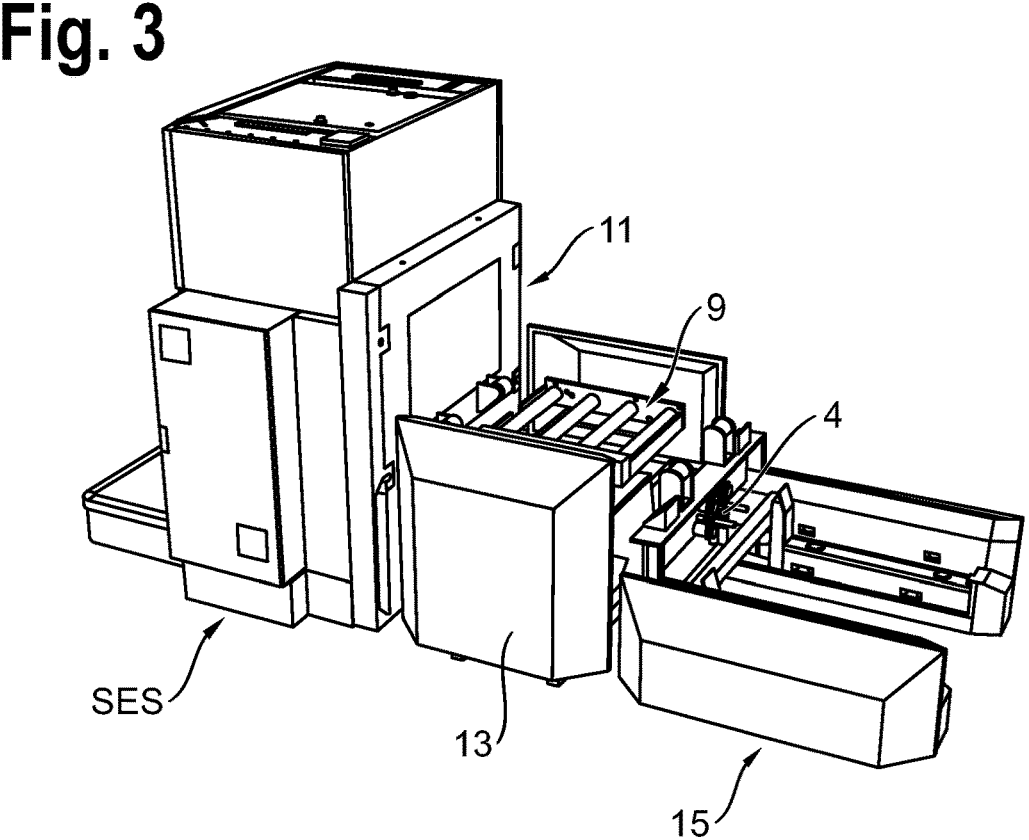
FIG. 3 shows a perspective side view of the pre- or post-processing station from FIG. 1.

FIG. 3 shows the pre- or post-processing station SES which serves to post-process exchangeable containers or (building) platforms for additive manufacturing after one manufacture and prepare them for renewed use. On the side of its inlet opening 11, this comprises a roller conveyor 9 on a rotary station 13 as well as on the side of the rotary station 13 facing away from the pre- or post-processing station SES an alignment station 15. The alignment station 15 is configured substantially the same as the supply station LS with the difference that instead of the supply coupling 3, only a centring device 4 is attached here.

Figure 4:
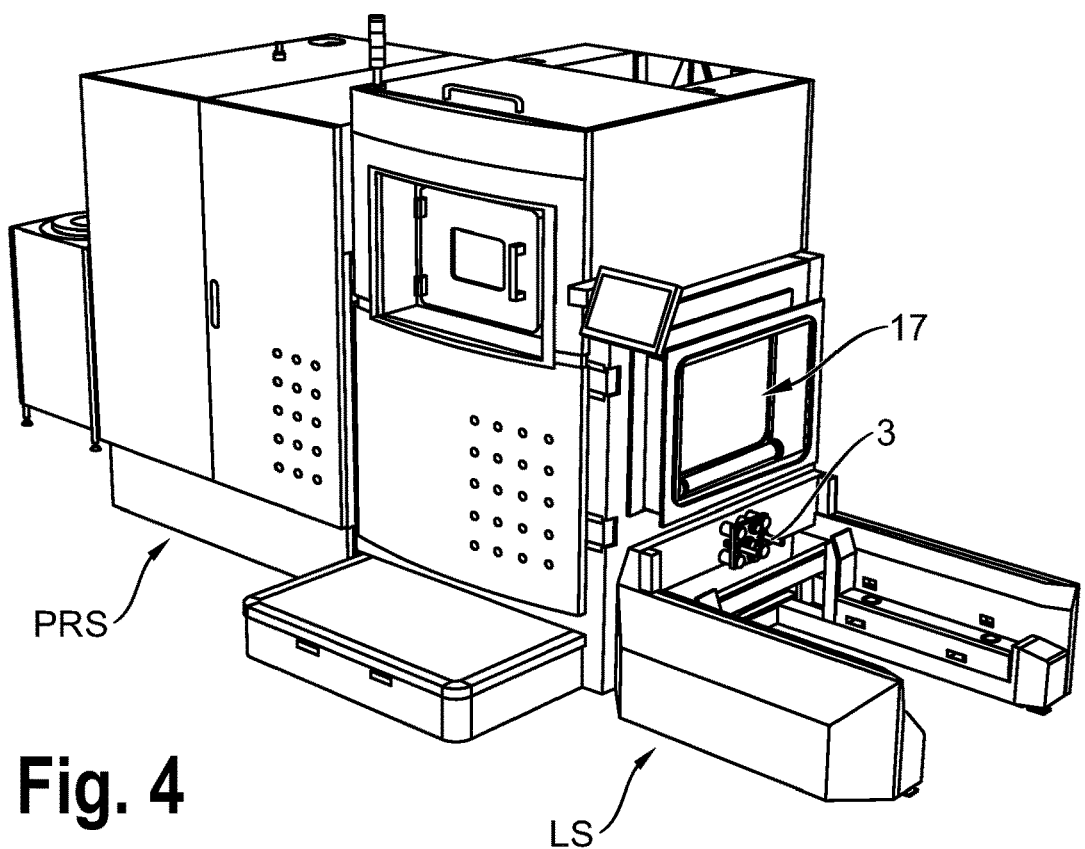
FIG. 4 shows a perspective side view of one of the additive manufacturing machines from FIG. 1.

FIG. 4 shows the additive manufacturing machine PRS which can be closed in a gastight manner via a lock 17 as output interface. A supply station LS (alternatively an alignment station 15) is attached to the side of the additive manufacturing machine PRS on which the lock 17 also lies.

Similarly FIG. 5 shows the unpacking station UNS, also with a lock 17' and a supply station LS (alternatively an alignment station 15) in a similar arrangements as in the additive manufacturing machine PRS.

Figure 7:
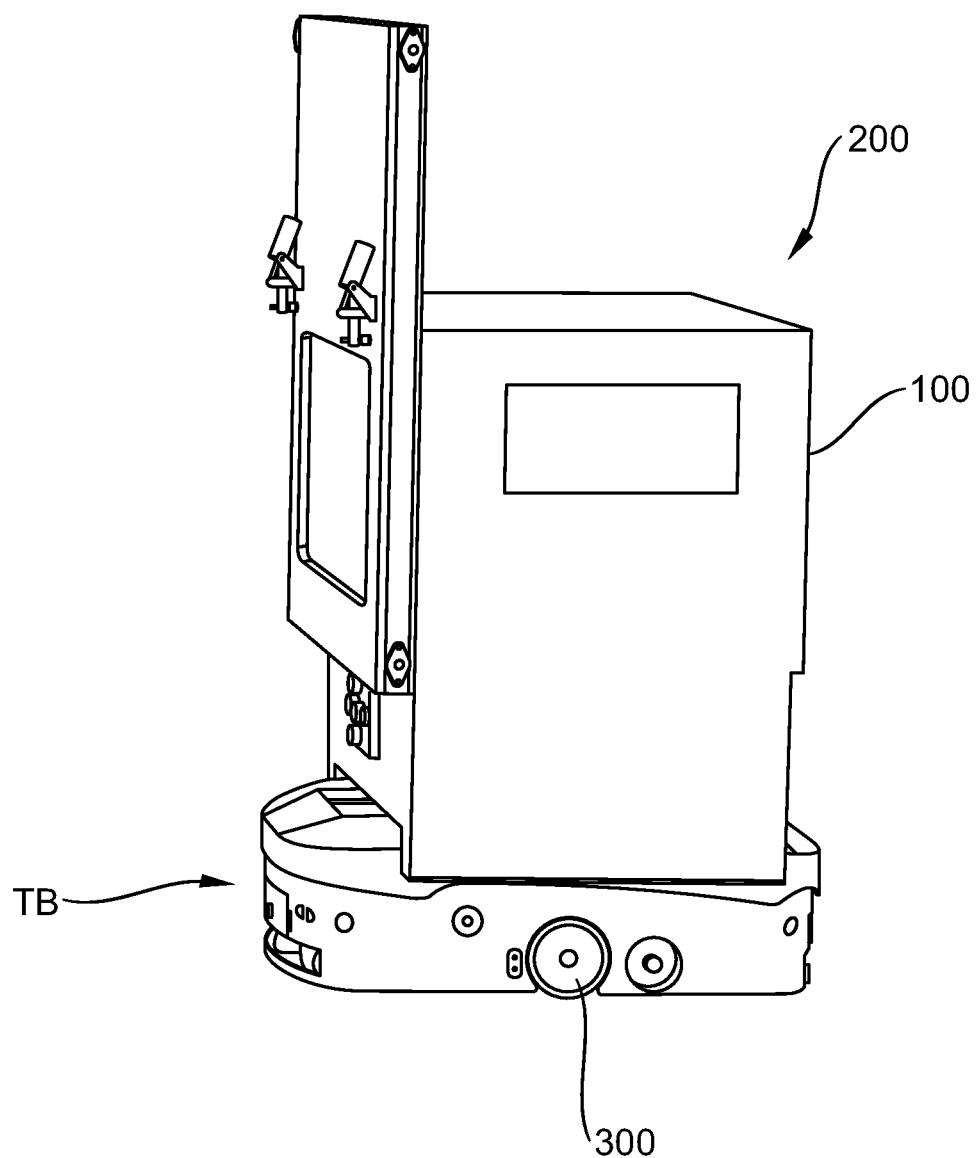
FIG. 7 shows a perspective side view of the transport unit according to FIG. 1.

FIGS. 6a and 6b show the storage chamber 100 of the transport unit 200 according to the invention. Storage chamber 100 and movable support region TB together form this transport unit 200. To this end the transport region TB can be inserted in an insertion region under the storage chamber 100 and there temporarily connected to the storage chamber 100, as can be seen in FIG. 7. It can also be seen there that the movable transport region TB is fitted with a number of rollers 300 which ensures its drivability.

The storage chamber 100 comprises a bulkhead 19 with an inflatable seal as a gastight takeover interface 19, a supply coupling 3' as connection interface 3; as a counterpiece to the aforementioned supply coupling 3, a roller conveyor 9' for conveying a container WB (a replaceable container which was used previously in the additive manufacturing machine PRS as a construction container) and below the roller conveyor 9' a space 23 for controller, battery, and pneumatics and a gas container 21 for the protective gas.

A typical sequence of an additive manufacturing chain using the described components is now outlined hereinafter. The additive manufacturing systems PRS produce three-dimensional components. The material for this is obtained directly via hose connections from the powder preparation stations PBS. The movable support region TB approaches a storage chamber 100 which is provided docked onto an additive manufacturing machine PRS. As a result of a gastight connection via the lock 17 of the additive manufacturing machine PRS and the bulkhead 19 of the storage chamber 100, the exchangeable container WB with finished three-dimensional components is inserted from the process chamber of the additive manufacturing machine PRS whilst maintaining the protective gas atmosphere into the storage chamber 100 by means of the roller conveyor 9'. The protective gas in the storage chamber 100 is provided by the gas container 21. As a result the exchangeable container WB can be removed directly after manufacture of the three-dimensional components without cooling times needing to be taken into account.

After the storage chamber 100 has been closed again in a gastight manner with the aid of the bulkhead 19, the transport unit 200 can be moved from the additive manufacturing machine PRS for example for cooling to the cooling station AS or after a cooling phase of the three-dimensional component inside the storage chamber 100 directly to the unpacking station UNS in which the exchangeable container WB is emptied, that is the three-dimensional component is at least coarsely separated from the surrounding construction material (powder). Further stations of the transport unit with three-dimensional components can then be the pre- or post-processing station SES, the surface treatment station OBS, the quality testing station QS and the removal station ES. In order to receive electrical energy or protective gas in the meantime, the transport unit 200 can be inserted into the supply station LS. For example in down times the movable transport region TB (which in the present example is fitted with rollers 300) can approach the supply and/or transfer store L, for example in order to bring ready-processed three-dimensional components into the transfer region $L_2$ or retrieve new powder or new platforms from the supply region $L_1$ which can then be transferred to the respective components PBS, SES or PRS. To this end it is not absolutely necessary (in some cases possible rather a hindrance) that the storage chamber 100 is entrained. On the contrary, the movable transport region TB can be designed similarly to a transport caterpillar or a forklift truck so that for example it grips under material pallets, raises and then transports them. This transport can be accomplished by direct (manual) or indirect (via a remote control) human control but can also be performed partially or completely automatically with the aid of a computer-based control system and for example make use of self-driving and independently monitored/controlled support regions TB.

Finally it should be mentioned that the embodiment shown here merely serves to illustrate the invention; the person skilled in the art can easily make comprehensive modification, omit or add components and above all modify. Thus, for example it is feasible to transport the exchangeable container directly instead of the storage chamber and connect to a protective gas connection of the transport unit 200. It should also be mentioned that in principle all installations operating under protective gas come into consideration as additive manufacturing machines (wherein protective gas is understood in the widest sense as a gas negative pressure) but preferably laser- or electron-beam-based selective fusion processes.

Finally it should also be noted again that the devices described in detail hereinbefore are merely exemplary embodiments which can be modified by the person skilled in the art in most diverse ways without departing from the area of the invention. Furthermore the use of the indefinite article "a" or "an" does not exclude the fact that the features concerned can also be present many times. Also the terms "unit," "module" and "component" do not exclude the fact that these consist of several, optionally spatially separate, subunits.

The invention claimed is:

1. A transport unit for transporting an additively manufactured three-dimensional component which has been generated by layerwise build-up of consecutive solidified layers corresponding to respective cross-sections of an object in an additive manufacture machine, the additive manufacture machine including a process compartment within which is received a build chamber having a build platform therein, with the build chamber housed in a build module which is removable from the process compartment of the additive manufacture machine, the build chamber having a protective gas environment contained within the build chamber in use, the transport unit comprising:

an interior space sized to receive the build module therein as a storage chamber, the storage chamber being sealable in a substantially gas-tight manner;

a transfer portal on a lateral vertical side of the transport unit which is opened and closed by a movable lock in a substantially gastight manner for the build module, the transfer portal being configured and arranged to cooperate with an outlet portal on a lateral vertical side of the process compartment of the additive manufacturing machine, the outlet portal having an interface which engages with the transfer portal in a sealing engagement, through which outlet portal the build module passes into the storage chamber thereby producing a substantially gastight connection based on the sealing engagement between the transfer portal and the output portal interface; and a conveyor mechanism carried on the transport unit, wherein the transport unit is movable including in a horizontal traverse to engage and disengage the transfer portal with the outlet portal, whereby the build module is movable on the conveyor mechanism between the process compartment and the storage chamber when so engaged, the protective gas environment thereby being maintained during and after transport of the build module from the process compartment of the additive manufacture machine into the storage chamber and the lock closed.

2. The transport unit according to claim 1, comprising:

a preparation unit, which during operation prepares a protective gas in the storage chamber and/or the container and/or a substantially gastight seal of the container.

3. The transport unit according to claim 2, wherein the preparation unit comprises a gas container for the protective gas which is entrained during transport.

4. The transport unit according to claim 2, wherein the preparation unit comprises a connection interface for supplying the protective gas into the storage chamber and/or the gas container.

5. The transport unit according to claim 1, wherein the storage chamber is configured to be detachable from a movable support region.

6. A preparation system for three-dimensional components comprising: at least one additive manufacturing machine with an output interface and a transport unit according to claim 1.

7. The preparation system according to claim 6, further comprising at least one of the following system components:

a cooling station having a first takeover interface which can be brought into functional cooperation with the transfer interface, an unpacking station having a second takeover interface which can be brought into functional cooperation with the transfer interface, a pre- and/or post-processing station, configured for pre- and/or post-processing of the container containing the three-dimensional component and/or the platform bearing the three-dimensional component a quality checking station, a surface processing station, configured for the surface processing of the three-dimensional component, a removal station, configured for removal of the three-dimensional component from the supporting platform with a fourth takeover interface which can be brought into functional cooperation with the transfer interface, a supply and/or transfer store for materials and/or aids for performing the additive manufacturing method and/or for the three-dimensional object, and a supply station with a number of supply connections to the transport unit.

8. A method for preparing a three-dimensional component, at least comprising the following steps: producing a three-dimensional component by means of additive manufacture, in particular powder-based additive manufacture, in a process chamber of an additive manufacturing machine under protective gas atmosphere, direct removal of the three-dimensional component from the process chamber by substantially continuous holding of the component in a protective gas atmosphere, in particular a storage chamber of a moveable transport unit, in particular according to claim 1, preparation of the component by transfer from the transport unit into a further processing unit and/or by outputting from the transport unit to a user.

9. The method according to claim 8, wherein the direct removal from the process chamber comprises a substantially cooling-pause-free removal.

10. The method according to claim 8, wherein nitrogen and/or argon is used as protective gas.

11. The method according to claim 8, wherein substantially the same protective gas is used in the process chamber and the storage chamber and/or the container.

12. The method according to claim 8, wherein following step b) the transport unit is transferred to at least one further system component of a preparation system as a further processing unit, in particular a system component of a preparation system.

13. The method according to claim 8, wherein the transport unit is moved spatially separately outside the additive manufacturing machine.

14. The method according to claim 8, wherein the three-dimensional component is made from a construction material which substantially comprises a number of polymers and/or a number of metals.

15. The method according to claim 8, wherein the transport unit is supplied by means of a supply station with a number of supply connections, for example for charging with electrical energy and/or for preparing the protective gas.

16. A transport unit for transporting an additively manufactured three- dimensional component which has been generated by layerwise build-up of consecutive solidified layers corresponding to respective cross-sections of an object in an additive manufacture machine, the additive manufacture machine including a process compartment within which is received a build chamber having a build platform therein, the additive manufacture machine having an elevator mechanism separate from the build module and which remains with the additive manufacture machine when a build module which is removable from process compartment of the additive manufacture machine is removed, the build chamber having a protective gas environment contained within the build chamber in use, comprising:

a transport unit having an interior space sized to receive the build module therein as a storage chamber, the storage chamber being sealable in a substantially gastight manner;

a transfer portal on a lateral vertical side of the transport unit which is opened and closed by a movable lock in a substantially gastight manner for the build module, the transfer portal being configured and arranged to cooperate with an outlet portal on a lateral vertical side of the process compartment of the additive manufacturing machine, the outlet portal having an interface which engages with the transfer portal in a sealing engagement, through which outlet portal the build module passes into the storage chamber thereby producing a substantially gastight connection based on the sealing engagement between the transfer portal and the outlet portal interface; and a conveyor mechanism carried on the transport unit, wherein the transport unit is movable including in a horizontal traverse to engage and disengage the transfer portal with the outlet portal, whereby the build module is movable on the conveyor mechanism between the process compartment and the storage chamber when so engaged, the protective gas environment thereby being maintained during and after transport of the build module and/or build platform from the process compartment of the additive manufacture machine into the storage chamber and the lock closed.

* * * * *